United States Patent Office 3,830,807
Patented Aug. 20, 1974

3,830,807
IRON CARBONYL COMPLEXES OF AZO
COMPOUNDS
Robert Putnam Bennett, Somerville, N.J., assignor to
American Cyanamid Company, Stamford, Conn.
No Drawing. Continuation-in-part of application Ser. No. 154,668, June 18, 1971, which is a continuation-in-part of Ser. No. 775,188, Nov. 12, 1968, both now abandoned. This application Oct. 6, 1972, Ser. No. 295,626
Int. Cl. C07d 51/10
U.S. Cl. 260—242                 3 Claims

ABSTRACT OF THE DISCLOSURE

A diiron hexacarbonyl complex of benzo(c)cinnoline is provided which has the formula

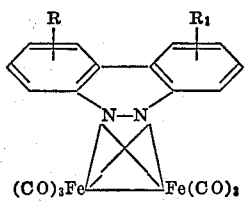

wherein R and $R_1$ are hydrogen, methyl or halogen. In addition, a method for preparing such complexes is provided which comprises reacting a benzo(c)cinnoline with an iron carbonyl at a temperature above about 100° C. in which the molar ratio of benzo(c)cinnoline to carbonyl is from about 1:1 to 3:2.

CROSS REFERENCE TO RELATED APPLICATION

This application is a continuation-in-part of U.S. Patent Application Ser. No. 154,668 filed June 18, 1971, now abandoned, which in turn is a continuation-in-part of U.S. Patent Application Ser. No. 775,188, filed on Nov. 12, 1968, now abandoned.

This invention relates to iron complexes of azo compounds. More particularly, this invention relates to iron carbonyl complexes of azo compounds, their method of preparation and to substituted phosphine, arsine and stibine derivatives of the iron carbonyl complexes.

BACKGROUND OF THE INVENTION

Attempts have been made in the past to prepare iron carbonyl complexes of azo compounds, particularly by employing photolytically promoted reactions of an azo compound with an iron carbonyl compound. Thus, when azobenzene was reacted with an iron carbonyl, the product was found to be a complex of o-semidine rather than iron carbonyl complex of azobenzene.

THE INVENTION

The present invention is based on the discovery that iron carbonyl complexes of aromatic azo compounds can be successfully formed by heating an azo compound with an iron carbonyl compound at elevated temperatures above 100° C. The reaction can be carried out either in the absence or presence of a solvent. It is preferred to carry out the reaction in an inert solvent in which both the starting materials and the product are soluble, such as decalin. The reaction temperature employed is that which effects the desired reaction without degrading a significant portion of the product. Thus, it is preferred to employ reaction temperatures in the range of from 110° C. to 170° C. The elevated temperatures are maintained until evolution of carbon monoxide gas substantially ceases. The product is then recovered by removing the solvent, if it is employed, and thereafter purifying the residue in any conventional manner, as for example by recrystallization. It has been determined by means of spectroscopy that the complexes have the following formula:

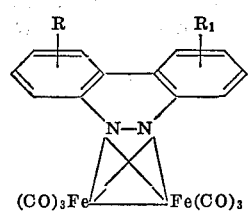

wherein R and $R_1$ are hydrogen, methyl or halogen.

The members of this new class of compounds are useful as initiators and promotors for the polymerization of certain monomers such as styrene and methyl methacrylate and, in addition, as anti-knock additives for gasoline. They are also useful as oxidation catalysts to promote the burning of fuel oils.

Any aliphatic or cyclic, cis or trans, azo compound can be reacted to prepare the complexes of this invention. The azo compound can be a non-azo or poly-azo compound. Illustrative azo compounds which may be used include compounds such as benzo(c)cinnoline and derivatives thereof including mono- or polyhalo-benzo(c)cinnoline, and polymethyl-benzo(c)cinnoline.

The iron carbonyls useful in forming the complexes are iron pentacarbonyl $(Fe(CO)_5$, diiron nonacarbonyl $$(Fe_2(CO)_9)$$

and triiron dodecacarbonyl $(Fe_3(CO)_{12})$.

The ratio of iron carbonyl reactant to azo reactant depends on (1) the iron carbonyl reactant employed and (2) the number of azo groups in the azo reactant to be complexed. For any given azo reactant the product is the same for all three iron carbonyl reactants. For each azo group complexed, the product contains a

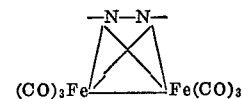

group. Therefore, when iron pentacarbonyl is employed, 2 moles of the carbonyl compound are required for each azo group. When diiron nonacarbonyl is employed, 1 mole of the carbonyl compound is required for each azo group. When triiron dodecacarbonyl is employed, 2 moles of the carbonyl compound are required for 3 azo groups. Accordingly, the molar ratio of azo to carbonyl may be stated as being from about 1:1 to 3:2. These reactions can be illustrated as follows:

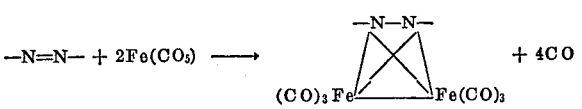

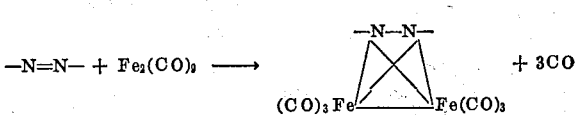

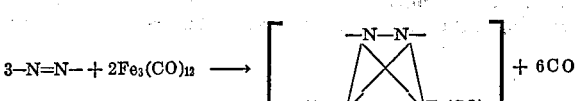

Generally, the use of about 10% excess of iron carbonyl reactant insures relatively complete reaction of the azo compound. When it is desired to partially complex the poly-azo compounds, at least sufficient iron carbonyl is employed to substantially completely complex one azo moiety of the azo compound. Subsequent to the reaction, the partially complexed azo compound can be separated from the totally complexed azo compound by column chromatography.

The following examples are provided for illustrative purposes and may include particular features of the invention. However, the examples should not be construed as limiting the invention, many variations of which are possible without departing from the spirit or scope thereof.

EXAMPLE 1

Benzo(c)cinnoline (13.92 g., 0.077 mole) and iron pentacarbonyl (32 g., 0.163 mole) were mixed in decalin (125 ml.) and heated at 150° C. until gas evolution ceased. The reaction mixture was cooled and then filtered and the filtrate chromatographed on alumina. The solvent was removed with petroleum ether and the product eluted with petroleum ether/benzene (4/1) which, on evaporation, yielded 28.25 g. (79% yield) benzo(c)cinnoline diiron hexacarbonyl, red crystals, m.p. 153–5° (dec.).

The complex which has the following structural formula:

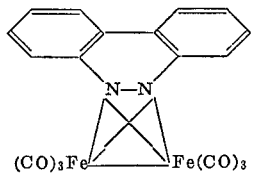

is non-conducting in nitromethane; mass spectrometry shows 6 carbonyl groups; ceric ammonium nitrate decomposes the complex to give a quantitative yield of benzocinnoline.

EXAMPLE 2

Using the procedure of Example 1 and the appropriately corresponding starting materials, the following iron carbonyl complexes were prepared.

1,10-Dichlorobenzo(c)cinnoline diiron hexacarbonyl

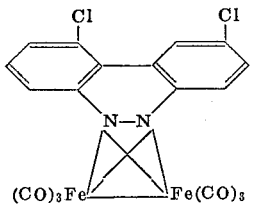

3,8-Dichlorobenzo(c)cinnoline diiron hexacarbonyl

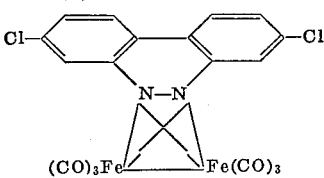

EXAMPLE 3

Preparation of Benzo(c)cinnoline diiron pentacarbonyl triphenyl Phosphine

Benzo(c)cinnoline diiron hexacarbonyl (1.0 g., 0.0022 mole) and triphenylphosphine (0.57 g., 0.0022 mole) in benzene (50 ml.) were heated for about ½ hour with stirring until gas evolution ceased. The reaction mixture was cooled and evaporated to dryness. The remaining solid was triturated with petroleum ether followed by warm ethanol to remove unreacted starting materials. The resulting solid was then dried, wt. 1.5 g. (100% yield), m.p. 205° (dec.).

EXAMPLE 4

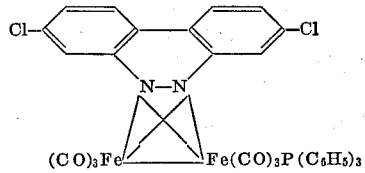

Using the procedure of Example 3, 3,8-dichlorobenzo-(c)cinnoline diiron pentacarbonyl triphenylphosphine was prepared.

EXAMPLE 5

METAL CARBONYL COMPLEX AS POLYMERIZATION INITIATOR

Two test tubes were prepared with 2 ml. of inhibitor-free styrene in each. To one test tube was added 10 milligrams of benzo(c)cinnoline diiron hexacarbonyl while the other sample was kept as a control. Both samples were left stoppered from the air, but exposed to light. After seven days, the material in the test tube containing the complex had polymerized and was completely solid while the control sample was still as fluid as it had been originally.

The above procedure was repeated using methyl methacrylate. After five days the sample with the complex had polymerized and was solid while the control was still fluid.

I claim:

1. A diiron hexacarbonyl complex of benzo(c)cinnoline which has the following structural formula:

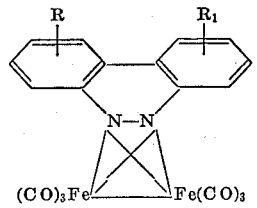

wherein R and $R_1$ are hydrogen, methyl or halogen.

2. The complex of Claim 1 in which R and $R_1$ are hydrogen.

3. The complex of Claim 1 in which R and $R_1$ are chlorine.

References Cited

Edgell et al., J. Am. Chem. Soc., vol. 87, pp. 3080–88 (1965).

Edgell et al., J. Am. Chem. Soc., vol. 88, pp. 4839–43 (1966).

Porter et al., J. Am. Chem. Soc., vol. 87, pp. 1628–30 (1965).

Yang, Dissertation Abstr., vol. 26, p. 1944 (1965).

Dekker et al., Chem. Comm., 1967, pp. 1243–44 (Dec. 6, 1967).

HARRY I. MOATZ, Primary Examiner

U.S. Cl. X.R.

44—63; 252—386; 260—80 C, 89.5 A, 93.5 C